W. D. SMITH.
FILLING STATION.
APPLICATION FILED NOV. 14, 1919.
1,410,418.  Patented Mar. 21, 1922.
3 SHEETS—SHEET 3.
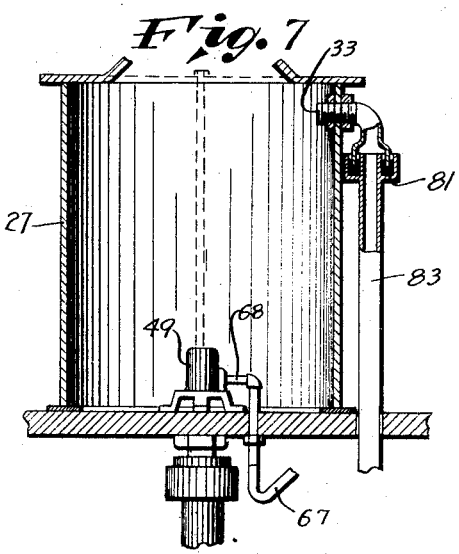
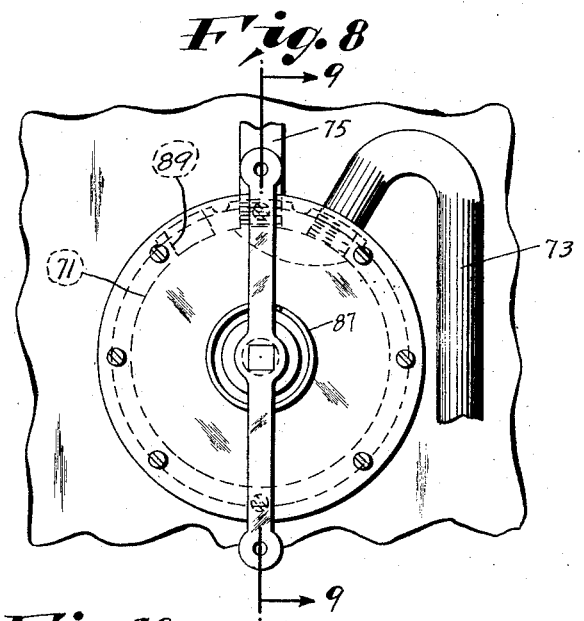
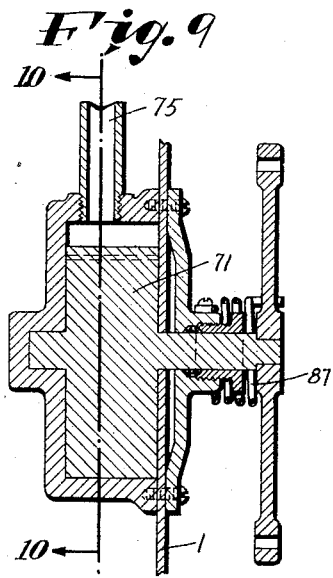
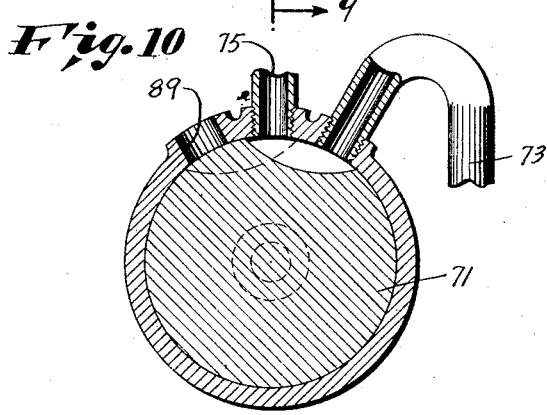
Inventor:
Willard D. Smith
By Delos G. Haynes
Attorney

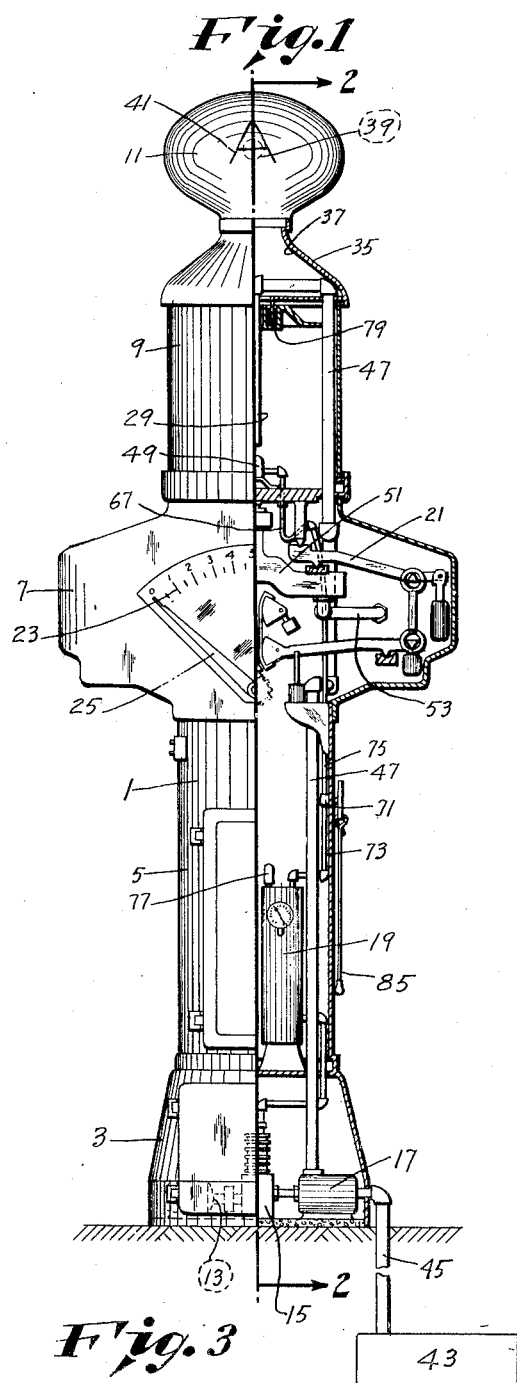
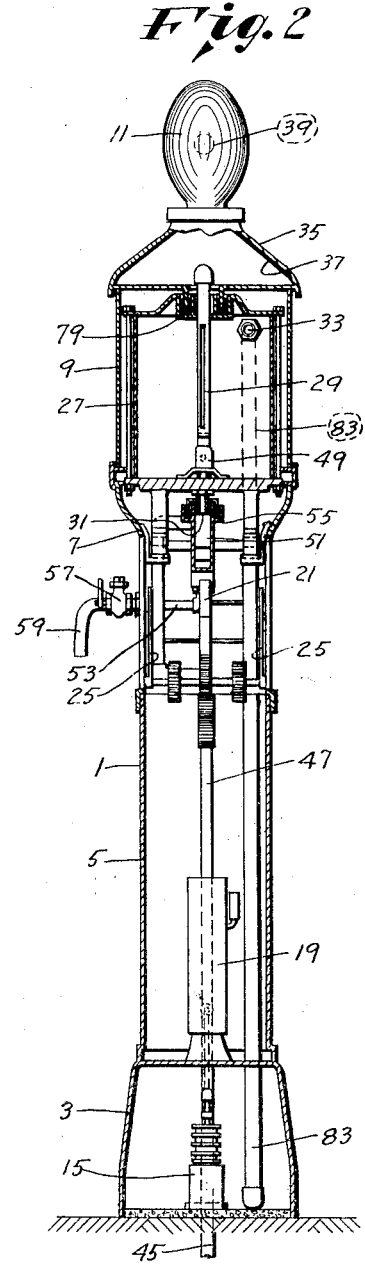
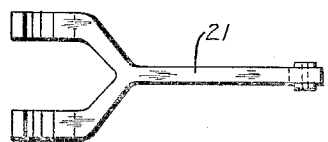

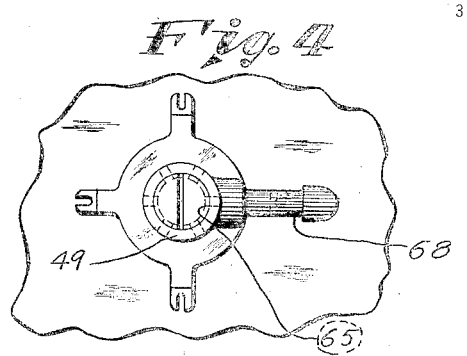
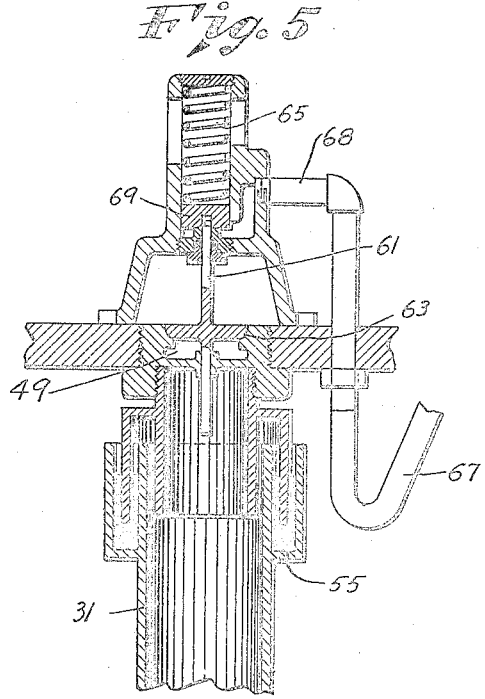
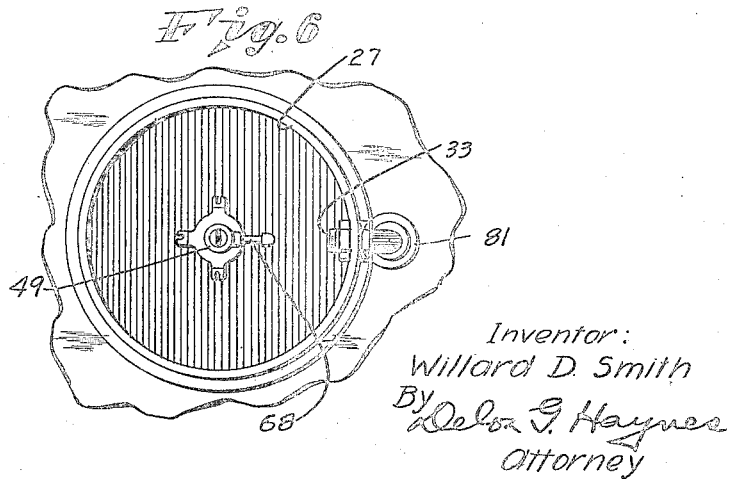

UNITED STATES PATENT OFFICE.

WILLARD D. SMITH, OF ST. LOUIS, MISSOURI.

FILLING STATION.

1,410,418.  Specification of Letters Patent.  Patented Mar. 21, 1922.

Application filed November 14, 1919. Serial No. 337,913.

*To all whom it may concern:*

Be it known that I, WILLIARD D. SMITH, a citizen of the United States, and a resident of St. Louis, State of Missouri, have invented an Improvement in Filling Stations of which the following is a specification.

This invention relates to filling stations, and with regard to certain more specific features to a device for dispensing gasolene from an underground storage tank.

Among the several objects of the invention may be noted the provision of accurate and durable apparatus for dispensing inflammable or explosive liquid; the provision of apparatus for dispensing by weight with a minimum of liability to derangement, and with an accuracy substantially independent of changes of temperature or pressure; and the provision of improved apparatus of this general type affording an immediate visible indication to the purchaser of the quantity of fluid that is being delivered to him. Other objects will be in part obvious and in part pointed out hereinafter.

The invention accordingly consists of the elements and combinations of elements, features of construction, and arrangement of parts which will be exemplified in the structure hereinafter described and the scope of the application of which will be indicated in the following claims.

In the accompanying drawings, in which is shown one of various possible embodiments of the invention—

Fig. 1 is an elevation, partly in section, of a preferred embodiment of the invention.

Fig. 2 is a vertical section on the line 2—2 of Fig. 1.

Fig. 3 is a detail of part of the scale mechanism.

Fig. 4 is a top view of the outlet valve and associated parts.

Fig. 5 is a sectional elevation thereof.

Fig. 6 is a horizontal section through the container.

Fig. 7 is a vertical elevation of the container.

Fig. 8 is a face view of the operating valve.

Fig. 9 is a section of the line 9—9 of Fig. 8.

Fig. 10 is a section of the line 10—10 of Fig. 9.

Similar reference characters indicate corresponding parts throughout the several views of the drawings.

Referring now more particularly to Figs. 1 and 2 of the accompanying drawings, there is indicated at 1 a standard of metal comprising a base 3, a lower portion 5, a central or scale portion 7, an upper or container portion 9, and a cap portion 11 surmounting the latter.

In general, the base portion 3 serves as a housing for the motor 13, air compressor 15 and pump 17. The motor is preferably in a separate housing from the remaining elements in this base portion, to reduce fire hazard.

In the lower portion 5 is the air reservoir 19.

In the central or scale portion 7 is an automatic scale 21 of the pendulum type provided with a pointer 23 and dial 25, and having as its load the container 27.

In the upper portion of the pedestal is the container 27 above referred to preferably of translucent or transparent material such as pyrex glass, together with inlet, outlet and overflow ports 29, 31 and 33 respectively. Above the container is a chamber 35 having in it one or more openings covered by a wire mesh 37, permitting escape of hydrocarbon vapors with a minimum fire hazard.

In the cap 11 is a source of illumination 39, supplemented, if desired, by advertising indicia 41 in or on the translucent or transparent body of the cap.

Gasolene is admitted to the apparatus from an underground storage tank 43, through the pipe 45 by the action of the pump 17, from which the gasolene passes through the inlet pipe 47 into the container 27 at the inlet port 29. The inlet port 29, as shown in Fig. 2, is formed by slotting or perforating the portion of the inlet pipe 47 that extends downwardly into the container. This causes the gasolene to be emitted in a substantially horizontal direction into the container, thereby minimizing or avoiding any indication of excessively high weight of gasolene (if the weight were taken during inlet), such as might be caused if the gasolene entered the container at a velocity having an appreciable vertical component. The starting and stopping of the pump 17 is controlled by the operator by suitable means, not shown.

The path of the gasolene from the container to the discharge port is through the outlet valve 49 into pipe 31, thence into the intermediate tank 51, whose function is to obviate any false indication on the scale during discharge, as hereinafter noted. This tank is preferably provided with a ball type vent valve (not shown) to permit it to empty freely. In order to avoid danger of fire in case this valve leaks, the valve preferably communicates directly with the vent chamber at the top of the pedestal through a suitable pipe (not shown) passing outside the container 27 and inside the cover 9 therefor, in similar manner to the mounting of the inlet pipe 49 and overflow pipe 83. Any such false indication on the scale during discharge is avoided because the gasolene drops freely from the outlet pipe 31, and this tank does not become full because the outlet pipe 53 is of larger diameter than the pipe 31. At the valve 49 is a mercury seal 55, shown in Fig. 5, so located as to permit vertical movement of the container 27 upon the scale without appreciable frictional resistance. In the pipe 53 is a quick-opening gate-valve 57 of conventional type. The gasolene passing through this valve leaves the apparatus at the hose outlet 59.

The outlet valve 49, above referred to, (Fig. 5) is air-actuated. The valve is of the piston type, having a stem 61 and seat 63, and is normally held closed by a compression spring 65. The valve is actuated through a flexible hose 67 connected with a small pipe 68, the air thus admitted passing beneath a plunger 69 mounted on a stem and positioned at the lower end of the spring 65 and forcing the stem and valve upward to open it at the will of the operator. The air for this purpose is admitted to the hose 67 (which is flexible in order to avoid false indication of weight at the scale) by the operating valve 71 (Figs. 1, 8, 9 and 10). This valve is shown in Fig. 10 as in position to admit air from the storage tank 19 through the air inlet 73. With the valve in this discharge position the air thus entering the valve passes through the air pipe 75, flexible hose 67 and pipe 69, above referred to, to operate the valve 49 and permit discharge of gasolene from the container.

The air for this purpose is compressed by a pump 15 as above noted, and is stored in a reservoir 19, which is provided with a suitable safety valve 77. The pump and reservoir serve the dual purpose of furnishing the air for operating the valve 49, and of supplying air for the inflation of tires. The cost of the apparatus can be somewhat reduced by omitting the pump and reservoir, in which case the valve 49 would preferably be operated by a small hand pump.

In addition to the mercury seal 55, two other mercury seals 79 and 81 are provided, at the gasolene inlet and overflow respectively. The height of the overflow port 33 may be adjusted if desired, but it is preferably determined by the manufacturer. Gasolene entering this overflow port passes through mercury seal 81 and overflow pipe 83 back to the underground storage tank 43.

The operation of the device in discharging gasolene from the container is as follows: Assuming that the container is full, that the scale pointer 25 is at zero, which corresponds to a full container, the operator pulls the rod 85, to turn the valve 71 clockwise (Figs. 8 and 10) from its left or dotted-line position (Fig. 10) corresponding to closed position of the valve 49, to the left hand or solid-line position (Fig. 10), shown also in dotted lines in Fig. 8. Air is thereby admitted from the storage tank through the valve 71 to open the valve 49, and thus permit gasolene to discharge from the container 27. When the proper amount of gasolene has been discharged from the container, as indicated by the pointer 25 on the scale 23 the operator releases the rod 85, whereupon the spring 87 returns the valve 71 to its left-hand position, causing the air in the pipe 68 and beneath the piston 69 to be exhausted to atmosphere at 89. The valve 49 is thus at once closed and further discharge of gasolene from the container is prevented. This prompt stopping of the flow of gasolene from the container at any time at the will of the operator materially reduces the fire hazard in this device as compared with the devices in which operator's control of the discharge of gasolene is not so immediately effective.

In view of the above, it is believed that the various features of this invention will be clear without further elaboration, and it will be seen that with the apparatus herein described, the several objects of the inventions are achieved and other advantageous results attained.

As many changes could be made in carrying out the above construction without departing from the scope of the invention, it is intended that all matter contained in the above description or shown in the accompanying drawings shall be interpreted as illustrative and not in a limiting sense.

I claim:

1. A filling station combining a container, means for filling the container, means limiting the amount in the container to a predetermined quantity, an automatic scale on which said container is mounted, means controlled thereby for indicating the weight of liquid in the container at or below said maximum quantity, and manually controlled means for discharging from said container desired portions of the liquid therein.

2. A filling station combining a container, an automatic scale on which said container is mounted, means for admitting liquid to the container, means limiting automatically the maximum level of liquid in the container, manually controlled means for discharging by gravity from said container desired amounts of the liquid therein, and means for indicating the weight of the amounts discharged, such indication being given automatically.

3. A filling station combining a container adapted to hold a predetermined quantity of liquid and having inlet, discharge and overflow conduits, an automatic scale on which said container is mounted, means for discharging liquid from said container, and mercury seals in certain of said conduits, each seal comprising two parts located respectively on the container and on the adjacent conduit portion movable relatively to the container.

4. A filling station combining a container, an automatic scale on which said container is mounted, means for discharging liquid from said scale, and vapor-tight means adapted to relieve the scale arm of any disturbance due to filling and discharge, said means being located partly on the container and partly on the adjacent portion of the respective conduit, movable with respect to the container.

5. A filling station combining a container, an automatic scale on which said container is mounted, means for discharging liquid from said scale, a vapor vent having a fire screen preventing entrance of fire therethrough into the apparatus, and mercury wells mounted at the junction of the relatively movable portions of the respective conduits and adapted to relieve the scale arm of any disturbance due to filling and discharge and to prevent escape of vapor from the apparatus except through said vent.

6. A filling station combining a container adapted to hold a predetermined quantity of liquid, an automatic scale on which said container is mounted, an air-operated valve operable from the exterior of the apparatus for discharging liquid from said scale, and means for closing said valve immediately at the will of the operator.

7. In apparatus of the class described, a container, an automatic scale supporting the container, means, comprising a pump, for filling the container, means limiting the amount of liquid in the container, means comprising a manually operated valve for discharging by gravity part or all of the liquid from the container, an indicator visible from the exterior of the apparatus, and means operated automatically by the scale for causing said indicator to indicate automatically the weight of liquid discharged from the container.

8. Apparatus of the class described, combining a container, an automatic scale supporting the container, means manually controlled for admitting liquid to the container, means manually controlled for discharging from the container, desired portions of the liquid therein, and a dial visible from the exterior of the apparatus and operated automatically by said scale for indicating the weight of liquid in the container, and the weight of liquid that has been discharged therefrom.

9. Apparatus of the class described, combining a container, an automatic scale supporting the container, inlet, discharge and overflow conduits to the container, a vapor-tight seal in the discharge conduit, means for discharging liquid therethrough in amounts and at speeds under control of the operator, and a scale dial visible from the exterior of the apparatus for indicating the position of the scale, the scale and dial being responsive at all times to the weight of the container and the liquid therein.

10. Apparatus of the class described, combining a container, an automatic scale supporting the container, means independent of the amount of liquid to be discharged, for admitting liquid to the container, an overflow determining automatically the maximum level of liquid in the container, means manually controlled for discharging liquid from the container, and a dial visible from the exterior of the apparatus and operated automatically by the scale, for indicating the position of the scale.

11. A filling station combining an underground reservoir, a pedestal having a discharge outlet for dispensing fluid therefrom, a pump, a motor therefor, a translucent container adapted to hold a predetermined quantity of liquid pumped into it by said pump, an automatic scale on which said container is mounted, means for discharging liquid from said container, means including a mercury seal for relieving the scale arm of any disturbance due to filling and discharge, a vapor vent having a fire screen preventing entrance of fire therethrough into the apparatus, an overflow tube limiting the height of liquid in said container, and a translucent covering surrounding the container and providing an air space between covering and container, whereby the purchaser may see the amount of liquid in the container.

In testimony whereof, I have signed my name to this specification this 12th day of November, 1919.

WILLARD D. SMITH.